Figure 1:
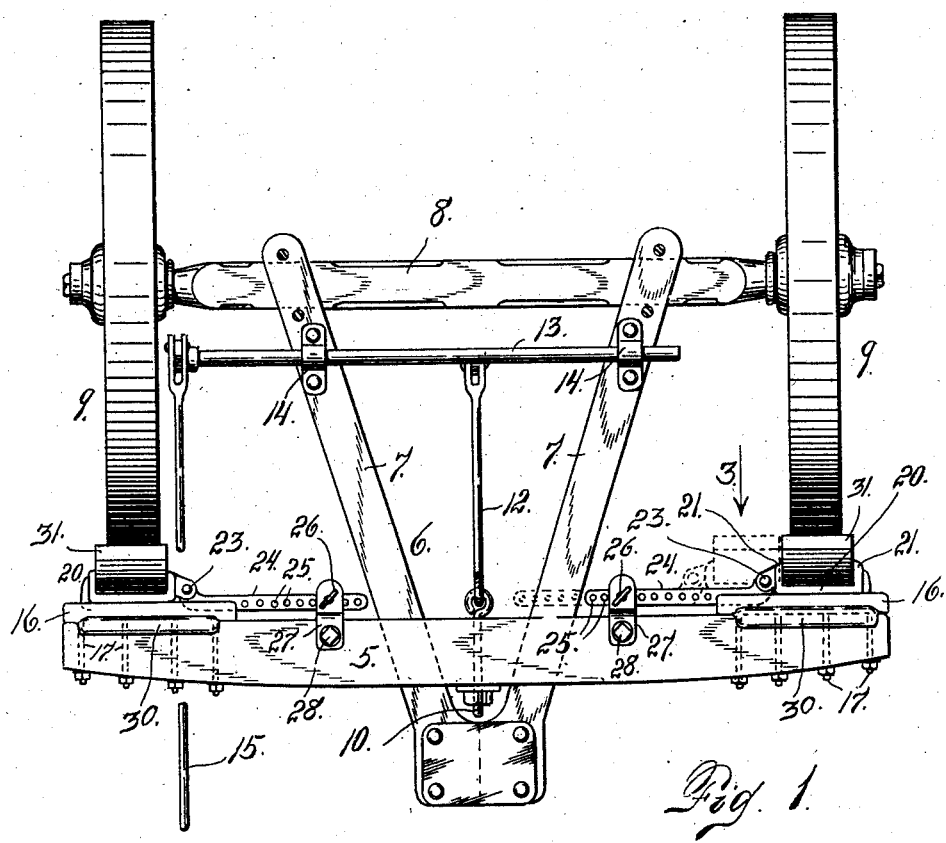

L. J. BADGLEY.
ADJUSTABLE VEHICLE BRAKE BLOCK HOLDER.
APPLICATION FILED JAN. 3, 1910.

974,012.

Patented Oct. 25, 1910.
2 SHEETS—SHEET 1.

Witnesses
Otto E. Hoddick.
J. D. Thornburgh.

Inventor
Lawrence J. Badgley.
By A. J. O'Brien.
Attorney

THE NORRIS PETERS CO., WASHINGTON, D. C.

L. J. BADGLEY.
ADJUSTABLE VEHICLE BRAKE BLOCK HOLDER.
APPLICATION FILED JAN. 3, 1910.
974,012.
Patented Oct. 25, 1910.
2 SHEETS—SHEET 2.
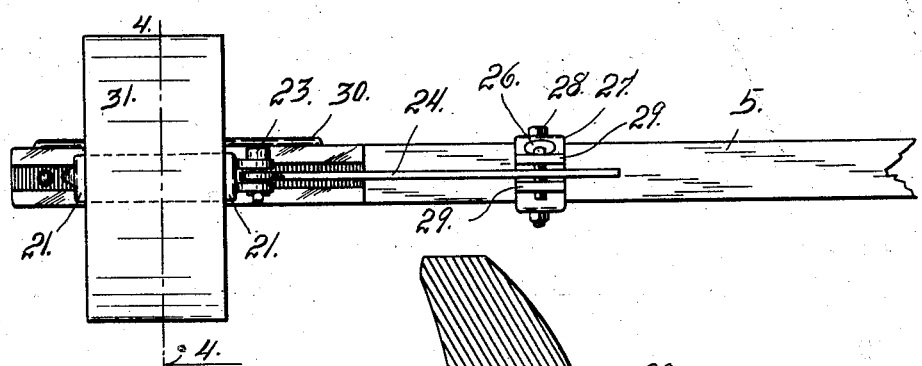
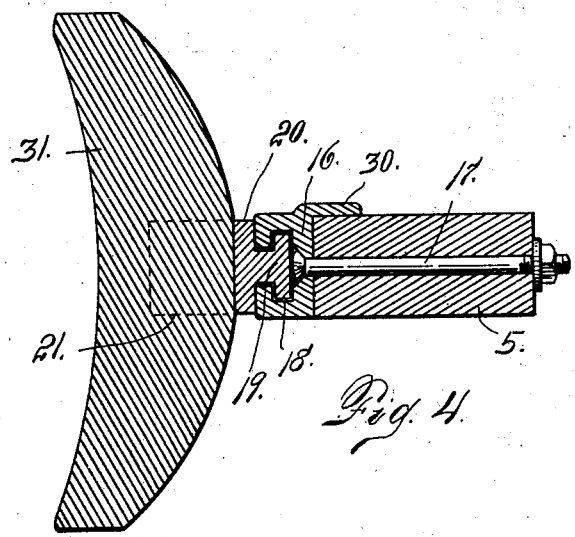
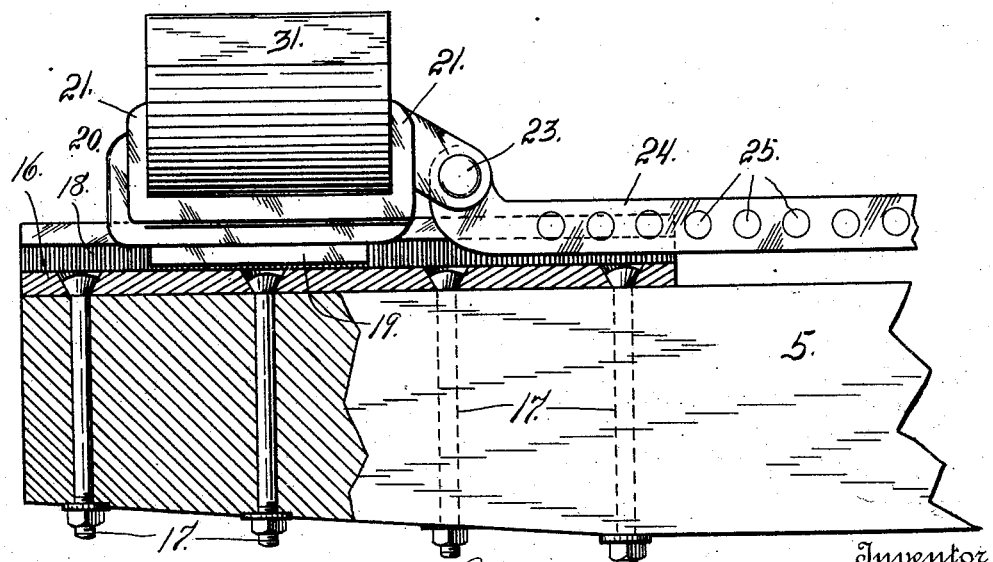
Witnesses
Otto E. Hoddick.
I. D. Thornburgh.
Inventor
Lawrence J. Badgley
By O'Brien.
Attorney

UNITED STATES PATENT OFFICE.

LAWRENCE J. BADGLEY, OF FLORISSANT, COLORADO, ASSIGNOR OF ONE-HALF TO HENRIETTA L. REDECKER, OF DENVER, COLORADO.

ADJUSTABLE VEHICLE-BRAKE-BLOCK HOLDER.

974,012. Specification of Letters Patent. Patented Oct. 25, 1910.

Application filed January 3, 1910. Serial No. 536,047.

*To all whom it may concern:*

Be it known that I, LAWRENCE J. BADGLEY, a citizen of the United States, residing at Florissant, county of Teller, and State of Colorado, have invented certain new and useful Improvements in Adjustable Vehicle-Brake-Block Holders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in adjustable vehicle brake-block holders, my object being to provide a device of this character which shall be laterally or transversely adjustable, whereby the block may be shifted to change the portion of its wearing face which engages the tire of the wheel or to disengage the block entirely from the tire by shifting it to one side thereof, when for any reason such adjustment shall be necessary or desirable. My improved brake-block holder is also readily detachable from the brake beam, which is an important advantage when it becomes necessary to renew the wearing face of the block.

In my improved construction the brake-block holder proper is slidable horizontally in a bracket mounted on the brake beam, the holder having a T-shaped or dovetailed tongue adapted to engage a groove of counterpart shape formed in the said bracket. The holder proper is adjustable by means of an arm pivotally connected with the holder and having openings adapted to receive a locking key or bolt for securing the holder in the desired position of adjustment. The said bracket is connected with the body of the beam by means of bolts whose heads are countersunk in the bracket at the bottom of the groove in which the tongue of the holder is located. This tongue covers the heads of the bolts and prevents the possibility of the accidental displacement of the bolts, since they cannot be removed while the tongue is in place.

Having briefly outlined my improved construction, I will proceed to describe the same in detail, reference being made to the accompanying drawing in which is illustrated an embodiment thereof.

Figure 2:
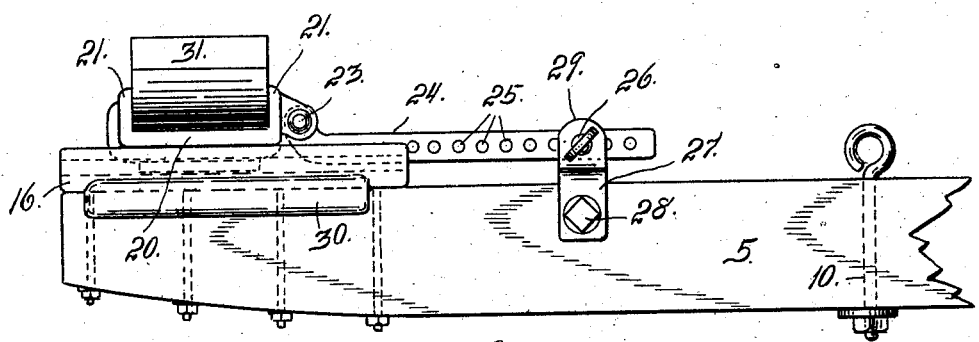

In this drawing: Figure 1 is a top plan view of the axle and rear wheels of a vehicle, illustrating the V-shaped portion of the reach upon which the brake beam is mounted. Fig. 2 is a fragmentary top plan view of the brake beam, shown on a larger scale. Fig. 3 is a fragmentary detail view of the brake beam and brake-block holder looking in the direction of arrow 3, Fig. 1, the parts being shown on a larger scale. Fig. 4 is a vertical section taken through the brake block, its holder, and the brake beam, taken on the line 4—4, Fig. 3. Fig. 5 is a fragmentary top plan view of the brake beam showing my improved brake-block holder in place, the brake beam and bracket being shown partly in section and on a scale larger than in any of the other views.

The same reference characters indicate the same parts in all the views.

Let the numeral 5 designate the brake beam which, as shown in the drawing, is supported upon the V-shaped portion 6 of the reach, the rear extremities of the arms 7 being connected with the rear axle 8, on which the wheels 9 are journaled. The brake-block is connected by means of an eyebolt 10 and a rod 12 with a rock shaft 13 journaled in bearings 14 mounted on the arms 7 and operatively connected with a rod 15 in the usual manner. Upon the opposite extremities of the brake beam are secured brackets 16 by means of bolts 17 which pass through the brake beam, their heads being countersunk in the bracket at the bottom of a T-shaped groove 18 in which a tongue 19 formed on the brake-block holder 20 is laterally or horizontally adjustable. This brake-block holder is provided with short arms 21 into which the brake-block 31 is tightly secured, the block being driven into place in the usual manner. Pivotally connected with the brake-block holder 20 by means of a pivot pin 23, is an arm 24 provided with openings 25 adapted to receive a locking key or bolt 26 passed through registering openings formed in a clip 27 secured to the brake beam by a bolt 28. This clip is provided with ears 29 between which the arm 24 passes, the ears being apertured to register with the openings 25 during the adjustment of the holder.

The bracket 16 is provided with a horizontally disposed flange 30 which overlaps the top of the brake beam and aids in securing the bracket in place, whereby the strain on the bolts 17 is greatly relieved when the brake-blocks are in engagement with the wheels. The tongue 19 of the brake-block holder is relatively short, while the bracket is comparatively long, thus giving the necessary range of lateral adjustment.

With my improved construction of brake-block holder, the block may be made much wider than the tire of the wheel, in fact twice as wide, if desired, so that if the wearing member 31 of the block has become considerably worn where the tire engages it, the block may be shifted to bring an entirely new or unworn portion of the wearing member into engagement with the tires of the wheels for braking purposes.

When my improved device is in use, it is evident that in order to adjust the brake-block holder laterally or horizontally, it will only be necessary to remove the key or bolt 26 and shift the brake-block holder to any extent desired. This adjustment may bring the brake-block entirely out of alinement with the tire of the wheel, if desired, (see the dotted line position in Fig. 1). By virtue of this construction it is evident that the holder may be readily entirely disengaged from the brake-block holder, which is very important when it becomes necessary to renew the wearing face of the block.

Having thus described my invention, what I claim is:

1. The combination with a brake beam, of a brake-block holder adjustable in a direction transverse to the plane of the wheel, an arm pivotally connected to the brake-block holder and extending longitudinally of the brake beam, and means for locking the said arm to the brake beam for holding the brake-block holder in the adjusted position, substantially as described.

2. The combination with a brake beam, of a brake block holder adjustable longitudinally of the beam and transversely to the plane of the wheel, an arm pivotally connected to the holder and extending longitudinally with the beam, and means carried by the brake beam for interlocking with the said arm for holding the brake-block holder in the adjusted position, substantially as described.

3. The combination with a brake beam, of a bracket secured thereto and provided with a dovetailed groove, a brake-block holder having a tongue adapted to enter the groove of the bracket and freely slidable therein, and an arm connected with the holder and having a series of openings adapted to receive a locking key for the purpose set forth.

4. The combination with a brake beam, of a bracket secured to the beam and having a dovetailed groove, bolts for securing the bracket to the beam, the heads of the bolts being countersunk in the bracket at the bottom of the groove, a brake-block holder having a counterpart tongue engaging the groove of the bracket and freely slidable therein, and an arm pivoted to the holder and extending longitudinally of the beam for the purpose set forth.

5. The combination with a brake beam, of a bracket having a horizontally disposed flange adapted to engage the top of the beam, the top of the bracket engaging the edge of the beam and having a dovetailed groove, a brake-block holder having a counterpart tongue engaging the groove, the tongue being freely movable in a groove for adjusting purposes, and an arm connected with the holder and having a series of openings adapted to receive a locking key or bolt for retaining the holder in the desired position of adjustment.

6. The combination with a brake beam, of a brake-block holder horizontally adjustable on the beam, an arm pivotally connected with the holder for manipulating purposes, and a guide-clip mounted on the brake beam and having separated apertured lugs through which the arm passes, and a fastening device passing through the apertures of the lugs and the openings in the manipulating arm, substantially as described.

In testimony whereof I affix my signature in presence of two witnesses.

LAWRENCE J. BADGLEY.

Witnesses:
 JNO. G. POWELL,
 JESSIE F. HOBART.